(12) United States Patent
Theis et al.

(10) Patent No.: US 9,167,219 B2
(45) Date of Patent: Oct. 20, 2015

(54) METHOD AND APPARATUS FOR AUTOMATIC FILM RESTORATION

(75) Inventors: Oliver Theis, Kalletal (DE); Ralf Koehler, Hannover (DE); Oliver Kamphenkel, Lehrte (DE)

(73) Assignee: Thomson Licensing (FR)

( * ) Notice: Subject to any disclaimer, the term of this patent is extended or adjusted under 35 U.S.C. 154(b) by 0 days.

(21) Appl. No.: 13/884,281

(22) PCT Filed: Jun. 8, 2011

(86) PCT No.: PCT/EP2011/059473
§ 371 (c)(1),
(2), (4) Date: May 9, 2013

(87) PCT Pub. No.: WO2012/065759
PCT Pub. Date: May 24, 2012

(65) Prior Publication Data
US 2013/0223817 A1    Aug. 29, 2013

(30) Foreign Application Priority Data

Nov. 16, 2010  (EP) .................................. 10306263
Feb. 25, 2011  (EP) .................................. 11305205

(51) Int. Cl.
*H04N 5/93*    (2006.01)
*H04N 9/79*    (2006.01)
(Continued)

(52) U.S. Cl.
CPC .............. *H04N 9/7908* (2013.01); *G06T 5/005* (2013.01); *H04N 1/409* (2013.01); *H04N 1/4097* (2013.01); *G06T 2207/10016* (2013.01)

(58) Field of Classification Search
CPC ..... H04N 9/8042; H04N 5/783; H04N 5/945; H04N 5/85; H04N 1/409; H04N 1/4097; G11B 27/3027; G06T 5/005; G06T 2207/10016
USPC ......................................................... 386/264
See application file for complete search history.

(56) References Cited

U.S. PATENT DOCUMENTS 6,928,192 B2     8/2005  Kobilansky et al.
2003/0039403 A1*  2/2003  Robins ........................ 382/275
(Continued)

FOREIGN PATENT DOCUMENTS

GB   2370932        7/2002
JP   2004302836     10/2004
(Continued)

OTHER PUBLICATIONS

Bob Johnson "Dust Removal in Adobe Lightroom" Earthbound light, Oct. 31, 2010, XP55006945, retrieved from www.earthboundlight.com
(Continued)

*Primary Examiner* — Thai Tran
*Assistant Examiner* — William Tran
(74) *Attorney, Agent, or Firm* — Jack Schwartz & Associates, PLLC

(57) ABSTRACT

A method and an apparatus for automatic restoration of an image or a sequence of images, e.g. motion picture films, are disclosed, which facilitate removal of artifacts within the image or the sequence of images. The restoration is split into a detection process, a quality control process, and a removal process. In the detection process artifacts in the image or the sequence of images are detected and information about the detected artifacts is stored in a metadata database. In the subsequent quality control process the information about the detected artifacts is reviewed by an operator. In the removal process one or more of the detected artifacts are removed from the image or the sequence of images based on the information about the detected artifacts stored in the metadata database.

12 Claims, 9 Drawing Sheets

(51) Int. Cl.
*H04N 1/409* (2006.01)
*G06T 5/00* (2006.01)

(56) References Cited

U.S. PATENT DOCUMENTS

| | | | |
|---|---|---|---|
| 2003/0231801 A1* | 12/2003 | Baggs et al. | 382/254 |
| 2006/0114358 A1* | 6/2006 | Silverstein et al. | 348/616 |
| 2006/0233432 A1 | 10/2006 | Ishida et al. | |
| 2006/0268345 A1* | 11/2006 | Silverstein | 358/3.26 |
| 2009/0175504 A1 | 7/2009 | Koarai | |
| 2009/0208053 A1* | 8/2009 | Kent | 382/103 |

FOREIGN PATENT DOCUMENTS

| | | |
|---|---|---|
| JP | 2005326934 | 11/2005 |
| JP | 2008283494 | 11/2008 |
| WO | WO9940724 | 8/1999 |

OTHER PUBLICATIONS

Search Report dated Oct. 5, 2011.
Anonymous, "Red Giant Software Unveils Film Restoration Tools for Mac OS X", http://www.redgiantsoftware.com/company/press-releases/archive/item/45/, Feb. 13, 2006, pp. 1-3.
Decenciere, E., "Restauration Automatique De Films Anciens", Doctoral Thesis Mathematics, L'Ecole National Superieure des Mines de Paris, France, Dec. 9, 1997, pp. 1-175.
Hannermann, J., "Contentus—Technologies for the media library of the future", http://theseus.pt-dlr.de/en/922.php, Jan. 2011, pp. 1-3.
Anonymous, "The Brava Project", http://brava.ina.fr, Nov. 30, 2009, pp. 1.
Anonymous, "Preservation towards storage and access. Standardised Practices for Audiovisual Contents in Europe", http://prestospace.org, Oct. 26, 2010, pp. 1.
Kokaram, A., "Motion Picture Restoration", Ph.D. Thesis, Cambridge University, England, May 1993, pp. 1-198.
Rares et al., "Statistical Analysis of Pathological Motion Areas", Proceedings of the IEE Seminar on Digital Restoration of Film and Video Archives, London United Kingdom, Jan. 16, 2001, pp. 1-6.
Morris, R., "Image Sequence Restoration using Gibbs Distributions", Ph.D. Thesis, Cambridge University, England, May 1995, pp. 1-122.
Kokaram, A., "Detection and Removal of Line Scratches in Degraded Motion Picture Sequences", Proceedings of Signal Processing VIII, Sep. 1996, vol. I, pp. 1-4.
Joyeux et al., "Detection and removal of line scratches in motion picture films", Proceedings 1999 IEEE Computer Society Conference on Computer Vision and Pattern Recognition, Fort Collins, Colorado, USA, Jun. 23, 1999, pp. 548-553.

* cited by examiner

METHOD AND APPARATUS FOR AUTOMATIC FILM RESTORATION

This application claims the benefit, under 35 U.S.C. §365 of International Application PCT/EP2011/059473, filed Jun. 8, 2011, which was published in accordance with PCT Article 21(2) on May 24, 2012 in English and which claims the benefit of European patent application No. 10306263.4, filed Nov. 16, 2010 and European patent application No. 11305205.4, filed Feb. 25, 2011.

FIELD OF THE INVENTION

The invention relates to a method and an apparatus for automatic restoration of images or image sequences, e.g. motion picture films, and more specifically to a method and an apparatus for removal of scratch and dirt objects within the images during automatic restoration.

BACKGROUND OF THE INVENTION

Motion picture films are part of our cultural heritage. Unfortunately, they are often affected by undesirable objects such as scratches, dust, dirt, stains, abrasion and some more. These usually come from the technical process of developing, handling, storing, and screening or scanning the film footage. In some rare cases static objects may already be induced during capturing, for example fluff within a lens or dirt on a scanner glass. In the following all these defects will be simply referred to as 'scratch and dirt'.

Scratch and dirt reduce the quality and the joy of film watching. This is, in most cases, not because a significant amount of visual information is lost. Actually, the opposite is true, scratch and dirt provide an extra amount of information, although it is entirely irrelevant. The human brain is very effective at substituting missing relevant information, based on its daily experience of vision. But its experience of how physical things in this world usually look and behave is constantly violated when viewing affected footage. For example, dirt deposited on the film during scanning or screening appears in one frame and disappears in the other. This contradicts human experience about objects usually appearing, moving, and disappearing smoothly and causes the brain to treat the abnormal visual stimulus exceptionally. Separating relevant and irrelevant information in this way is therefore stressful and tiring for the viewer. Removal of scratch and dirt is required to keep viewers relaxed and focused on the content and is, therefore, an important part of any restoration process.

Preferably restoration is carried out digitally after scanning. Although there are wet scanning techniques, which feed the material through a chemical cleansing process to reduce dirt and potential scratches before scanning, they are not used widely due to a number of technical problems which make them quite costly. In addition, a lot of footage has already been scanned and archived digitally on tape.

Apparently manual restoration of digitized films by finding and removing each scratch and dirt object is a time consuming business, although there is software on the market that assists artists in many aspects of the job. In particular, manual restoration of old content with large amounts of either scratch or dirt may not be financially viable. This is even more the case for large archives with footage of unknown commercial value.

The application of automatic restoration software with algorithms that try to detect and remove scratch and dirt is the only viable alternative to a manual process. At present there are a number of software and hardware products available on the market which perform detection and removal of scratch and dirt more or less automatically. Usually a manual adjustment of certain parameters is needed to fine tune detection and removal, sometimes individually for each scene. After processing, the restored output or parts thereof have to be either accepted or rejected, with the option of rerunning restoration with different parameters. This is unsatisfactory since the adjustment takes time and quality may be not good enough in critical scenes that have not been specially adapted. Detection of scratch and dirt is a nontrivial problem that is currently not totally solved. There is still a certain ratio of objects that will either not be detected or falsely detected.

BRIEF SUMMARY OF THE INVENTION

It is an object of the invention to provide a solution for restoration of images, which allows to control and improve the results of automatic film restoration algorithms in an efficient way.

According to one aspect of the invention, this object is achieved by a method for restoring an image or a sequence of images, which comprises the steps of:
  detecting artifacts in the image or the sequence of images;
  storing information about the detected artifacts in a metadata database; and
  removing one or more of the detected artifacts from the image or the sequence of images based on the information stored in the metadata database.

Similarly, an apparatus for restoring an image or a sequence of images comprises:
  a first image processor for detecting artifacts in the image or the sequence of images;
  a metadata database for storing information about the detected artifacts about the detected artifacts; and
  a second image processor for removing one or more of the detected artifacts from the image or the sequence of images based on the information stored in the metadata database.

The solution according to the invention, which separates the restoration process into detection of objects, e.g. scratch and dirt objects, and removal using an automatic metadata driven workflow, has a plurality of advantages. Contrary to state-of-the art workflows for artifact removal it is not necessary to individually adjust the parameters for different content. At the same time the restoration results are fully reproducible and there is no redundant processing effort due to iterations. Furthermore, the metadata generated during the object detection process allows to generate a comprehensive quality report based on the information stored in the metadata database. Therefore, the solution according to the invention is well-suited for the restoration of large film archives. During the detection process, a metadata database is build automatically with entries for each artifact.

Advantageously, a quality control process is performed on the information stored in the metadata database after storing information about the detected artifacts in the metadata database and before removing one or more of the detected artifacts from the image or the sequence of images.

When automatic scratch and dirt restoration algorithms that do not require manual parameter adjustment are used, the number of objects is significantly reduced while other image regions are left completely untouched. Although not perfect, these algorithms allow to achieve good results in many cases without user interaction. However, as the metadata database is build automatically during the detection process it may be inaccurate or incomplete due to imperfect algorithm performance. Therefore, in critical situations, where perfect restoration is required, results can be improved through a graphical review of the metadata for each object after detection and before removal. This is achieved by the metadata driven three step restoration workflow.

The division of the restoration process into a detection process and a removal process allows to modify, add, and remove entries, i.e. objects, within the metadata database during the quality review. The quality review takes place exclusively on the metadata database and is based on individual frames or a sequence of frames. Favorably, an artifact is removed from the metadata database by deleting the information about the artifact in the metadata database or deselecting the artifact for removal by setting the value of a removal toggle flag.

Advantageously, the information about an artifact includes one or more of an index of the artifact, a type of the artifact, coordinates of a rectangular bounding box, a frame index of the appearance of the artifact, a binary pixel mask of bounding box size, a number of affected pixels, a detection weight, a removal flag, the removal toggle flag, and removal information. This information enables a comprehensive quality control process. In addition, the information is well suited for displaying detected defects in a graphical user interface.

Preferably, the information about an artifact further includes at least one of an index of the same artifact in a previous image and an index of the same artifact in a subsequent image. Objects such as scratch or static dirt usually spread across multiple frames. Therefore, it is useful to store the index of the same object in the frame before and after.

For the quality review favorably a graphical user interface is provided, which allows to annotate scratch and dirt objects, to individually remove detected scratch and dirt objects, and to add scratch and dirt objects (graphically) by hand. Preferably, the graphical user interface further allows to correct detected artifacts manually using specialized graphical editors.

Favorably, at least one of a total area of the detected artifacts within an image and a total area of the artifacts set for removal within the image is determined. These values are helpful for statistical purposes, but also for the graphical review of the metadata.

BRIEF DESCRIPTION OF THE SEVERAL VIEWS OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF THE INVENTION

Figure 1:
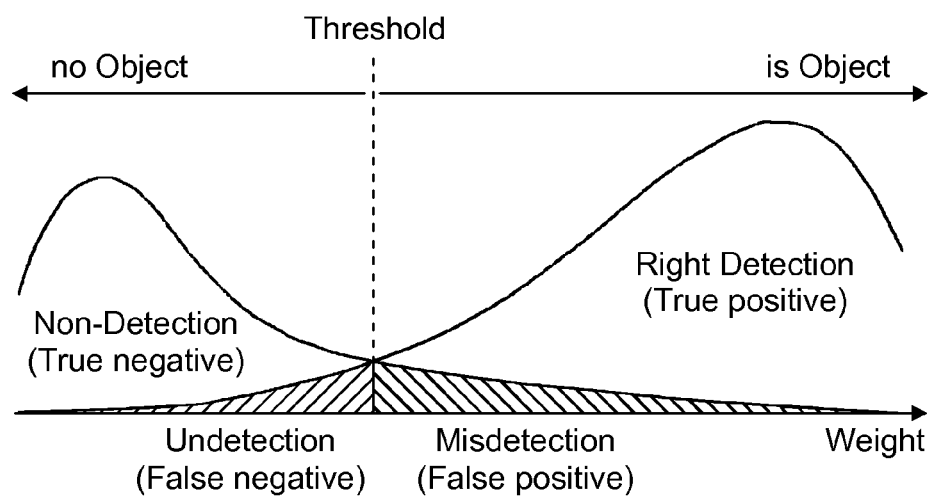
FIG. 1 illustrates the problem of scratch and dirt detection.

The detection of scratch and dirt objects fully automatically, without parameter adjustment by the user, on digitized film footage is a challenging task due to a number of varying factors like noise, grain, flicker, jitter, motion, and content itself. The design of detection algorithms generally aims at reducing the misdetection and undetection rates by separating likelihoods around a detection threshold. This is schematically illustrated in FIG. 1. For real world algorithms the probability density functions of objects usually overlap with probability density functions of other frame content. This means that the object misdetection and undetection rates will always be greater than zero. The reasons for this will be explained in the following.

Figure 2:
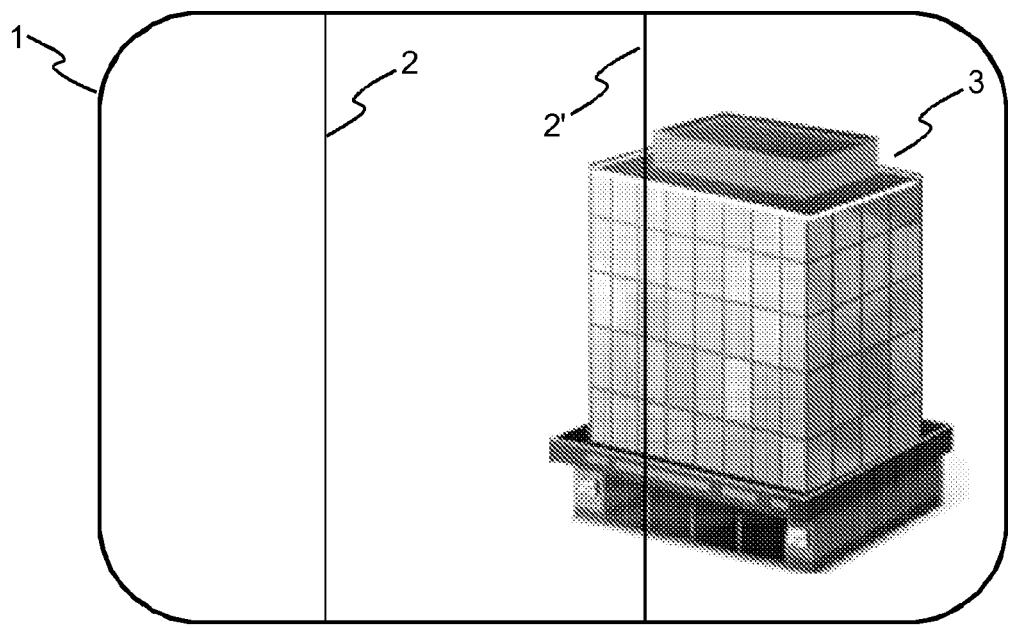
FIG. 2 depicts a frame with two scratches.
Figure 3:
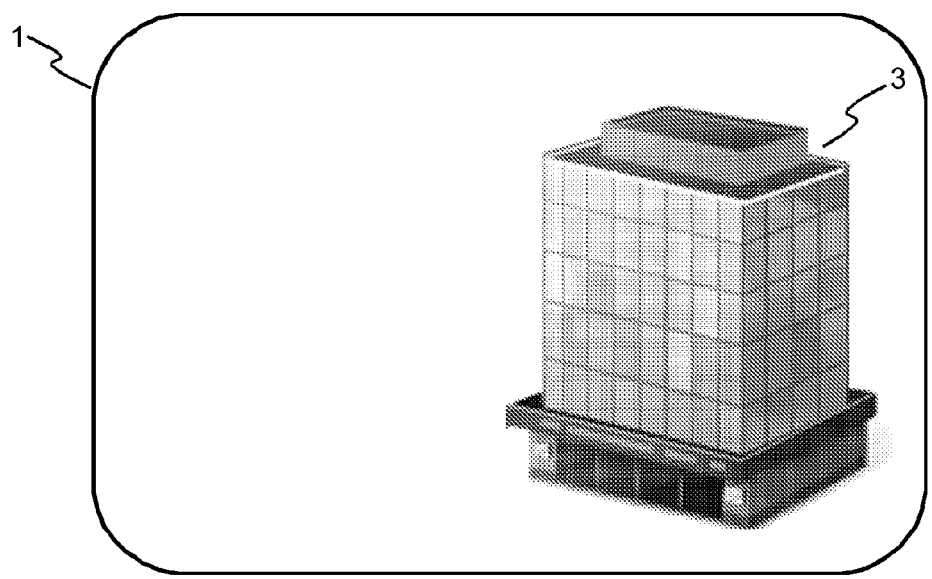
FIG. 3 shows the frame of FIG. 2 after removal of the scratches.

FIGS. 2 and 3 illustrate the problem of detection and removal of scratches. In FIG. 2 a frame 1 with two scratches 2, 2' is shown. FIG. 3 depicts the same frame 1 after removal of the scratches.

Scratches result from small particles continuously damaging the surface of a film during the transport through processors, projectors or scanners. They tend to wander across each frame. If the wandering speed is slow they are nearly vertical and appear in multiple frames at almost the same position. If, however, the wandering speed is high they show a significant horizontal component and may even appear and disappear in a single frame. A problem with vertical scratches is that they can easily be confused with vertical image features, as present in the building 3 in FIG. 2. This is often the case for man-made objects, such as buildings, bridges and fences.

Scratches that appear in multiple frames at almost the same position largely destroy temporal information about the content underneath the scratch. Therefore, removal has to utilize spatial information of the surrounding area of the scratch.

Figure 4:
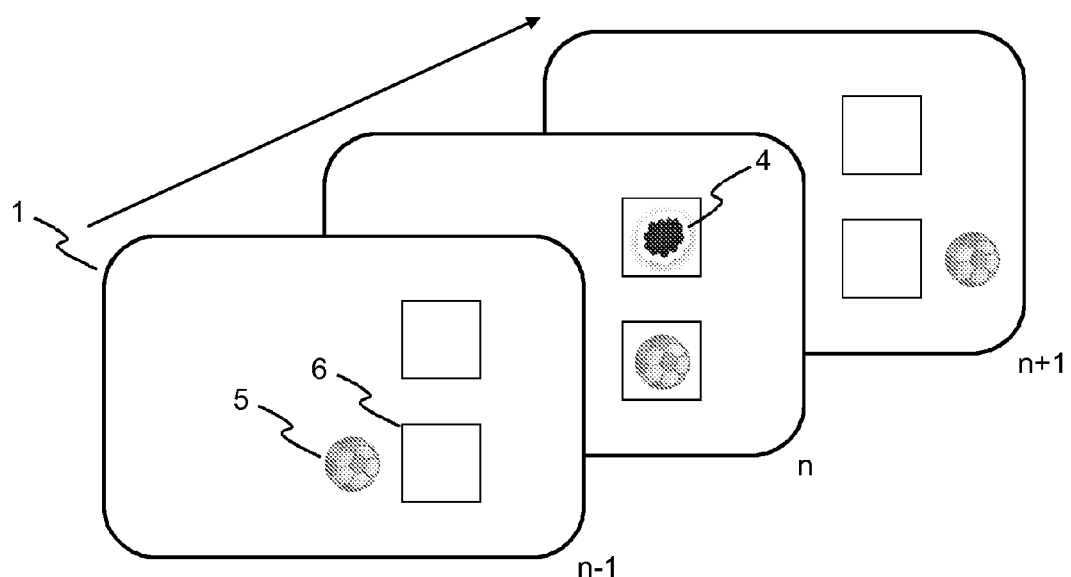
FIG. 4 depicts a sequence of frames with a dirt object and a moving object.
Figure 5:
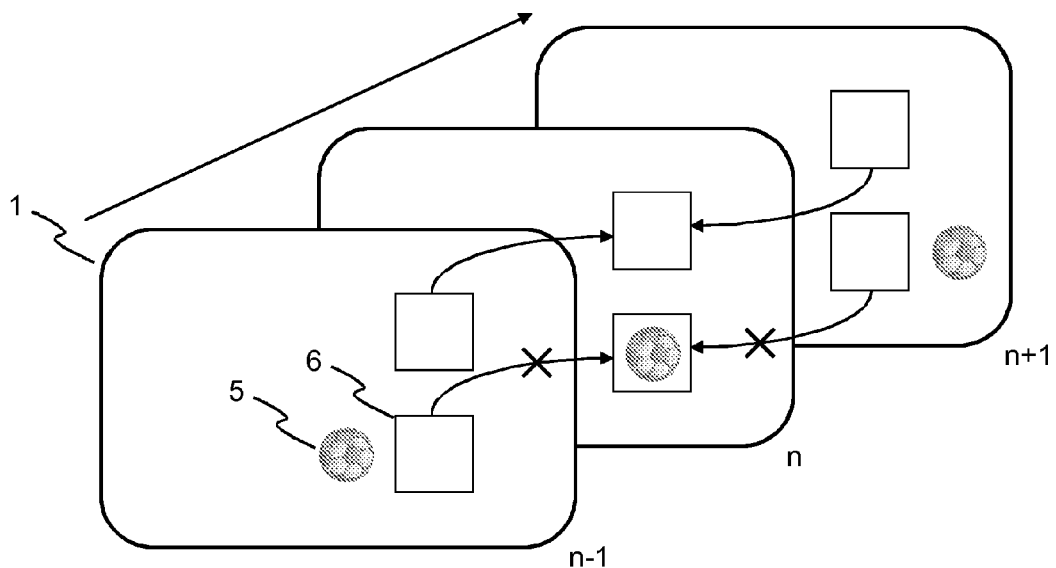
FIG. 5 shows the sequence of frames of FIG. 4 after removal of the dirt object.

FIGS. 4 and 5 illustrate the problem of detection and removal of dirt. In FIG. 4 a sequence of frames 1 with dirt object 4 and a moving object 5 is shown. FIG. 5 depicts the same sequence of frames 1 after removal of the dirt object 4. Dirt, if not static, disposed on the film surface appears in one frame and disappears in the next. Looking at a local neighborhood, the same is true for a moving object. The sequence of frames 1 in FIG. 4 shows a moving object 5, namely a ball, moving from left to right, inside a neighborhood window 6 at frame n. The moving object 5 cannot be found in frame n+1 and n−1 at the same window position. The main problem is thus to discriminate dirt from motion. To this end, motion is taken into account.

A further problem arises through pathological motion, that is caused by erratic motion, motion blur, occlusion, uncovering and other effects that have the same temporal characteristic as dirt.

Dirt objects 4 can easily be removed by cloning in cases where the content underneath has not changed significantly from frame to frame. The situation is more difficult in the case of (pathological) motion, since the position of the original content underneath the dirt object 4 may have changed significantly.

Figure 6:
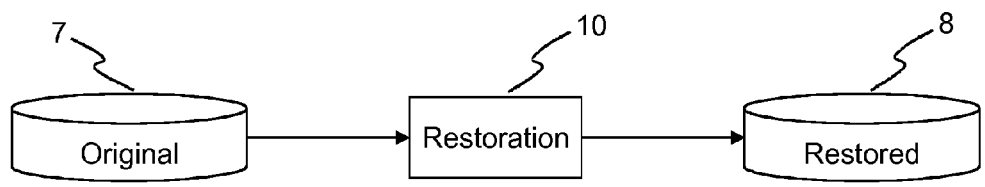
FIG. 6 illustrates an automatic single step process for film restoration.

In FIG. 6 an automatic single step restoration process 10 for generating restored content 8 from original content 7 is depicted. Such a single step, unsupervised restoration process 10 might be sufficient in many cases once automatic scratch and dirt restoration algorithms perform equally well on any scene and kind of footage. However, perfect algorithms are not yet available. A main issue is to control the algorithm quality for different kinds of footage.

Figure 7:
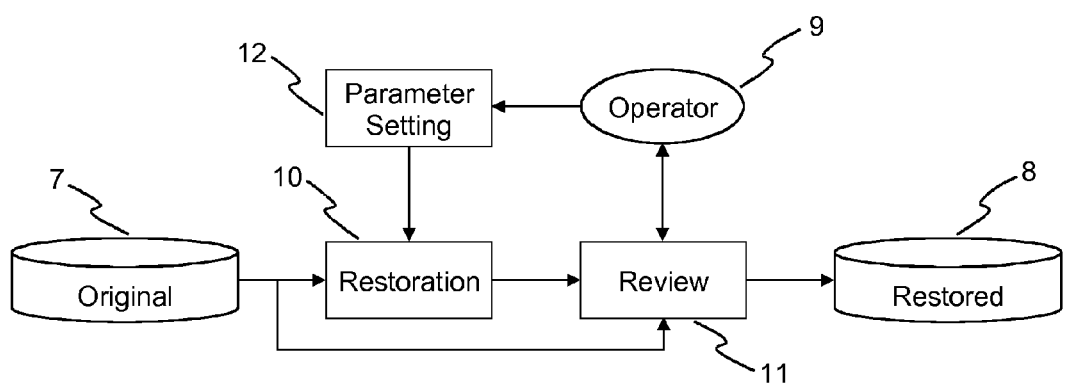
FIG. 7 shows an operator-assisted frame based restoration process.

A common solution for this problem is shown in FIG. 7, where an operator 9 is placed in the restoration loop to review 11 the results frame by frame and to individually adjust 12 restoration algorithm parameters. This iterative single step, fully interactive workflow potentially allows perfect removal of scratch and dirt depending on the time and skills of the operator. Sophisticated software tools are available that provide restoration algorithms and help the operator to compare restored content 8 and original content 7.

Figure 8:
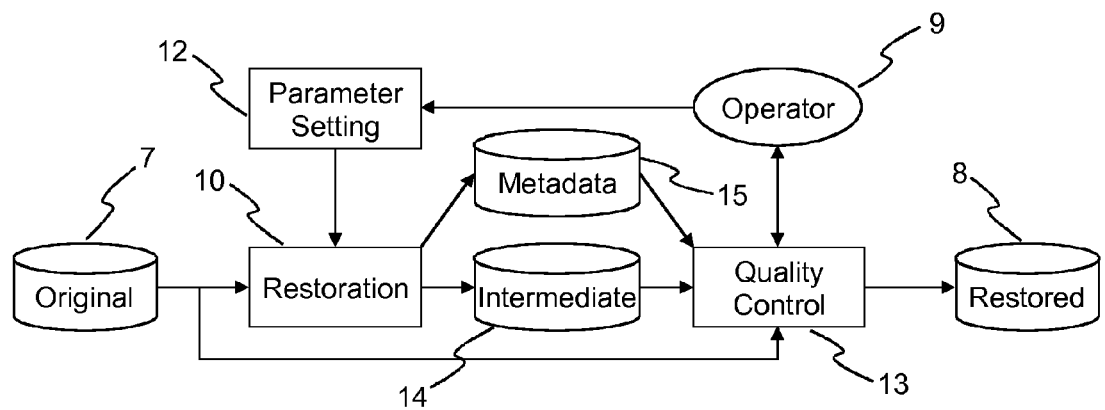
FIG. 8 illustrates an operator-assisted sequence based restoration process.

In order to reduce operation time, the loop is usually split into two stages, as shown in FIG. 8, which illustrates an operator-assisted sequence based restoration process. The restoration process iteratively works on sequences of frames, e.g. scene cuts. Restoration is initiated by the operator 9 with a certain parameter set and intermediate results 14 are stored. In a quality control step 13 the intermediate results 14 are either accepted or rejected and processing is restarted with adjusted parameters or bounded processing regions. Together with the intermediate results 14, metadata sets 15 with general information gathered during the restoration stage, like noise level, grain level, motion vector fields and scene cut positions, may be stored. Defect specific information like locations and size may be additionally stored and presented to the operator to guide restoration. The generation of metadata allows the rather qualitative process of screening to be turned into a quantitative measurable quality process. For example, the number of objects and the cumulative area (pixel count) per frame is stored as metadata 15 in addition to the restored output 8. After processing, a graphical representation of the complete metadata set gives information about how many pixels per frame have be altered. Still, the generated metadata 15 only help on deciding to accept or reject results.

Figure 9:
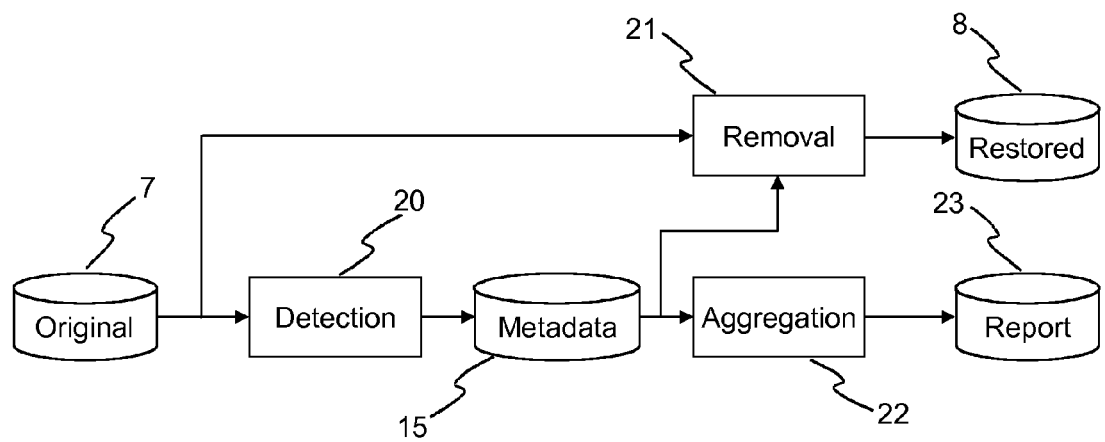
FIG. 9 depicts a split restoration process according to the invention.

According to the invention, in order to check the quality of the restoration process before producing the final output, the restoration process is split into a detection process 20 and a removal process 21, as schematically illustrated in FIG. 9. Metadata 15 serves for information transfer between the two processes 20, 21. In the detection process 20 the detection algorithms work automatically and generate metadata information 15, which is then used during the removal process 21. The detection results are aggregated 22 for a comprehensive quality report 23, which may be checked by a human or a machine.

Figure 10:
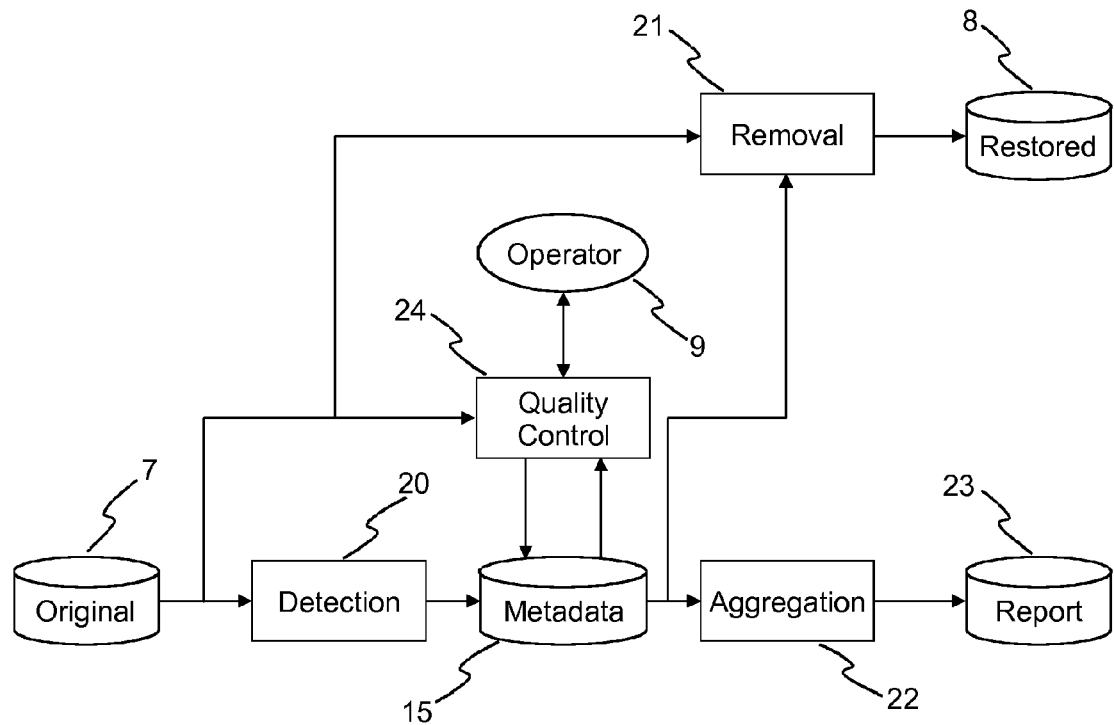
FIG. 10 shows a further refined three-step workflow for film restoration.

FIG. 10 depicts a further refined three-step workflow, in which a quality control 24 carried out by the operator 9 is interposed between detection 20 and removal 21 of scratch and dirt objects. During quality control 24 the metadata database 15 is edited interactively, e.g. by modifying or adding descriptions of scratch or dirt objects, before removal is carried out.

In the following a detailed description of the three-step workflow will be given. Of course, for the two-step workflow of FIG. 9 the steps related quality control are not performed.

Figure 11:
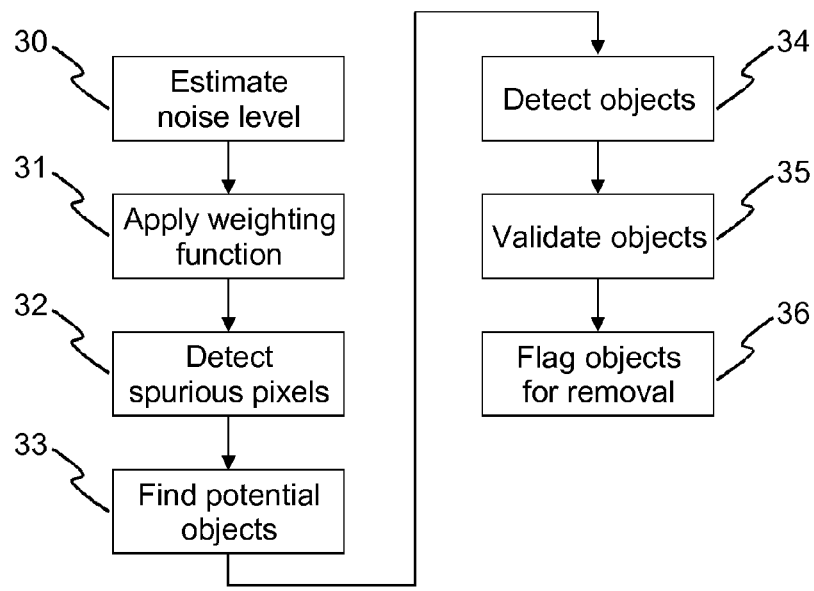
FIG. 11 schematically illustrates a multistep-detection strategy for scratch and dirt.
Figure 12:
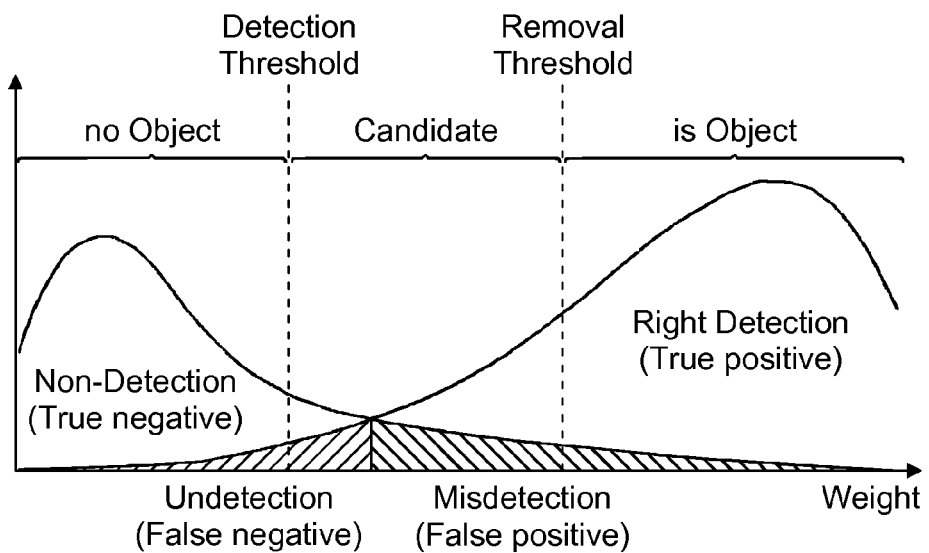
FIG. 12 illustrates exemplary object and non-object probability density functions and their relation to the detection threshold and the removal threshold.

The automatic detection 20 of scratch and dirt objects without manual parameter adjustment, especially on digitized film footage, is a complex task due to a number of varying factors like noise, grain, flicker, jitter and (pathological) motion. To cope with the different factors, a multistep-detection strategy is applied to scratch and dirt. This strategy is schematically illustrated in FIG. 11. In a first step 30 the overall noise level is estimated. Subsequently a detection 31 of spurious pixels is performed. By clustering of the spurious pixels potential objects are identified 32. After identification a weighting function is applied 33 to the potential objects. Subsequently the objects are detected 34, e.g. by weight thresholding. This means that only those potential objects with a weight greater than a defined detection threshold are stored in the metadata database 15. The detection threshold is set relatively low in order to reduce false negative events. Finally, the objects are validated 34 and flagged 35 for removal. The removal flag property is automatically set in the flagging step 35 depending on a predefined removal threshold weight, which is set higher than the detection threshold to prevent false positives from being removed. The removal flag also depends on the object validation carried out in the validation step 34. The design of the algorithms used for the detection 31 of spurious pixels, identification 32 of potential objects, and application 33 of the weighting function affects the shape of the object and non-object probability density functions. The design aims at reducing their overlap region in order to reduce false detections. FIG. 12 illustrates exemplary object and non-object probability density functions and their relation to the detection threshold and the removal threshold.

Scratch and dirt objects are considered as objects of certain type which cover a finite area within a single frame. This is in contrast to artifacts effecting the complete frame such as noise, flicker etc. Preferably, for each scratch and dirt object the following set of properties is stored as descriptive information in the metadata database 15:

Type (scratch or dirt)
Coordinates of rectangular bounding box
Frame index appearance
Binary pixel mask of bounding box size
Number of affected pixels
Detection weight
Removal flag (set automatically)
Removal toggle flag (set by user)
Removal information In the following the generation of metadata for scratch and dirt objects is explained for digitized film material $y(h,v,t)$, which is a 3-dimensional field with vertical, horizontal, and temporal indices. Depending on the type of footage $y(h,v,t)$ may either be a scalar for black and white films or a triple of RGB or YUV values for color film.

A unique metadata set $meta(t,n)$ is defined for each object n that has been detected out of N objects within frame number t of T frames. An object is defined to cover a certain finite region of the frame matrix $y(:,:,t)$. Metadata sets may be divided into object types, e.g. $metaScratch(t,n)$, $metaDirt(t,n)$. In the following $metaX(t,n)$ is used to denote either one or both types. That means that scratch and dirt objects may have the same number n. Advantageously the following object properties are stored:

a) In order to identify and discriminate objects a unique index must be set. Numbering may be performed according to the object location starting from the left top down to the right bottom of the frame:
metaX(t,n).index=n{1, . . . , N}
b) In case that object numbering is consecutive over all object types, differentiation by a type property is needed:
metaX(t,n).type={'scratch'|'dirt'|'static dirt'| . . . }
c) The width and height of a rectangular bounding box is defined by the maximum horizontal and vertical extend of the object xWidth(n) and yWidth(n). Together with the top left corner xPos(n) and yPos(n) defining the horizontal and vertical position of the area covered by the box is unambiguously specified:

$$b(t, n) = y(yPos(n):yPos(n) + yWidth(n) - 1,$$
$$xPos(n):xPos(n) + xWidth(n) - 1, t)$$

Figure 13:
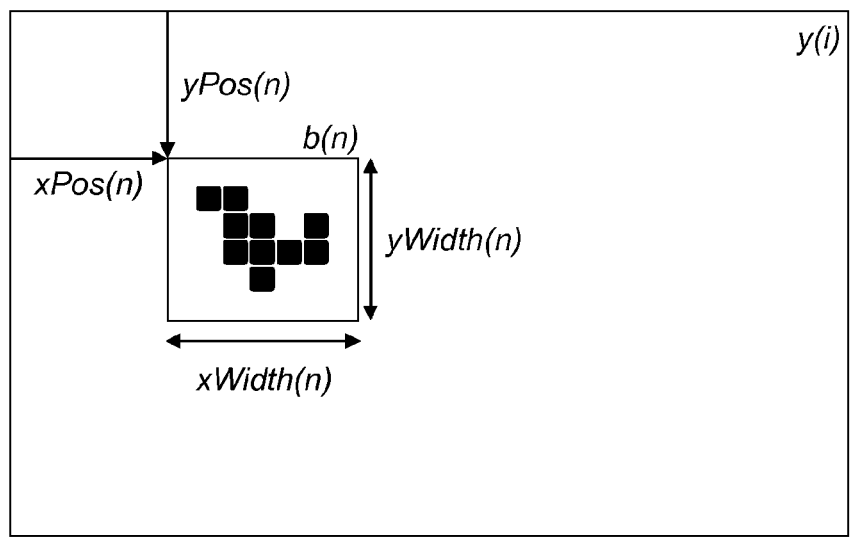
FIG. 13 depicts an exemplary bounding box of a scratch or dirt object.

An exemplary bounding box is illustrated in FIG. 13. The property box is, therefore, defined as a four element vector:
metaX(t,n).box=[xPos(n) yPos(n) xWidth(n) yWidth(n)]
d) For the unique description of pixels covered by the object within frame matrix y(:,:,t) different methods are available. It is assumed that each object n of type X after detection is defined by a binary mask maskX(1:yWidth(n),1:xWidth(n),n), with '1' indicating that the object is present at that location. For example, the binary mask for the object shown in the bounding box of FIG. 13 would be described by the following table:

TABLE 1

| 0 | 0 | 0 | 0 | 0 | 0 | 0 | 0 |
|---|---|---|---|---|---|---|---|
| 0 | 1 | 1 | 0 | 0 | 0 | 0 | 0 |
| 0 | 0 | 1 | 1 | 0 | 0 | 1 | 0 |
| 0 | 0 | 1 | 1 | 1 | 1 | 1 | 0 |
| 0 | 0 | 0 | 1 | 0 | 0 | 0 | 0 |
| 0 | 0 | 0 | 0 | 0 | 0 | 0 | 0 |

According to a first method the information of the binary mask is stored by storing the binary mask itself:
metaX(t,n).pixel=maskX(:,:,n)
According to another method a list of indices is stored for which mask equals '1':
metaX(t,n).pixel=find(maskX(:,:,n))
e) A Boolean flag meta.remove indicates whether the object is going to be restored in a subsequent removal step or not. The value might be set to false whenever the decision of the automatic detection is not clear and requires approval by a reviewer:
metaX(t,n).remove={true|false}
f) Objects such as scratch or static dirt usually spread across multiple frames. Therefore, it is proposed to store the index of the same object in the frame before indexForward and after indexBackward. Null is used to indicate that there is no correspondence.
metaX(t,n).indexForward={1, . . . , $N_{forward}$|0}
metaX(t,n).indexBackward={1, . . . , $N_{backward}$|0}
g) For review and statistical purposes it is proposed to store the area of all objects or objects of a certain type X that have been detected by building the sum of '1' in all masks:
metaX(t).areaDetected=sum(maskX(:,:,:))
h) Similarly, for review and statistical purposes it is proposed to store the area of all objects or objects of a certain type X that have been detected within frame t and will be removed by building the sum of '1' in all masks for which metaX.remove(t,n) equals 'true'.
metaX(t).areaRemoved=sum(maskX(:,:,metaX(t,n).remove))
i) Advantageously metaX(t,n) contains a field metaX(t,n).replacement,
which provides information of how to carry out removal, i.e. in which way object pixels given by metaX(t,n).pixel have to be altered or substituted if metaX(t,n).remove=true. Disregarding the state of metaX(t,n).remove, metaX(t,n).replacement is preferably always defined since metaX(t,n).remove may be altered during the quality control step 24. The field has the advantage that no processing for finding a suitable replacement pattern is required during the removal step 21. This means removal is computationally less demanding, although detection does take longer. Also, the amount of metadata increases.

According to a first possibility, metaX(t,n).replacement for object n having a surrounding box b(n) is obtained by directly storing only those values of r(n) that are covered by the object:
metaX(t,n).replacement=r(metaX(t,n).pixel)).
Alternatively, the difference between b(n) and r(n) is stored:
metaX(t,n).replacement=r(metaX(t,n).pixel))−b(metaX(t,n).pixel)).
According to a further alternative, if r(n) has been found by cloning from an image region in the current or any other frame before or after, a three-element vector is stored with horizontal offset yOff(n), vertical offset xOff(n), and temporal offset tOff(n):
metaX(t,n).replacement=[yOff(n) xOff(n) tOff(n)].

Reviewing in the quality control step 24 allows to edit a metadata set 15 that already results in a 'good enough' output to obtain a metadata set 15 for an 'excellent' restoration result. Of course, the actual result will depend on the amount of time spent by the operator 9. In addition, the quality control step 24 may also be useful to control algorithm quality without modifying data sets manually. Quality control is carried out by checking and modifying metadata. This allows to control the quality more objectively through a countable measure and potentially much quicker than interactive side-by-side frame comparison. After metadata has been approved a quality report for the original file is preferably generated together with a change log for the restored version.

Figure 14:
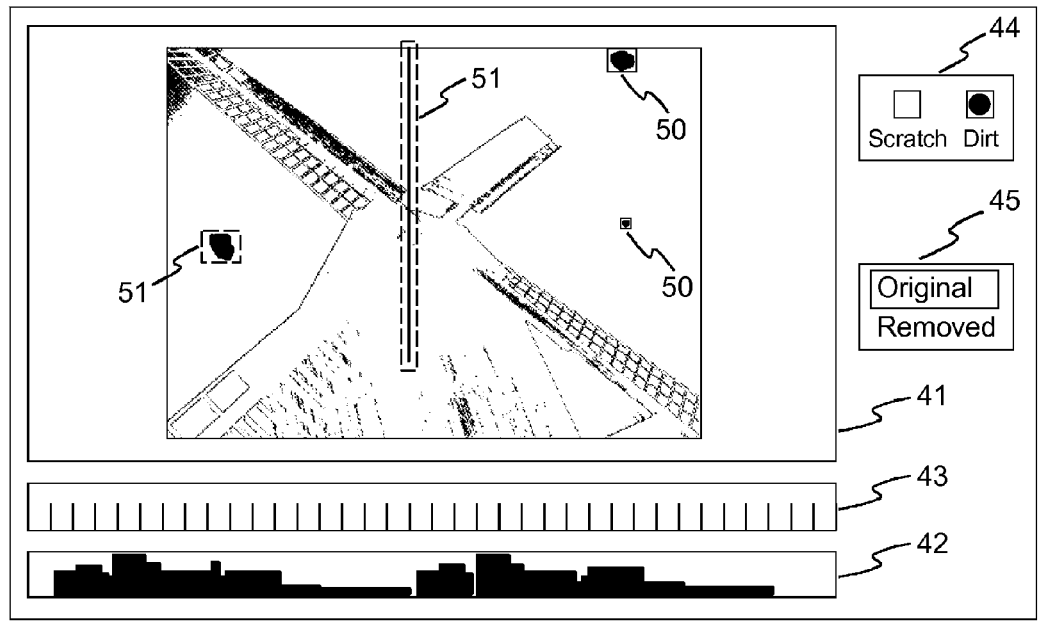
FIG. 14 shows an exemplary graphical representation of the metadata base.
Figure 15:
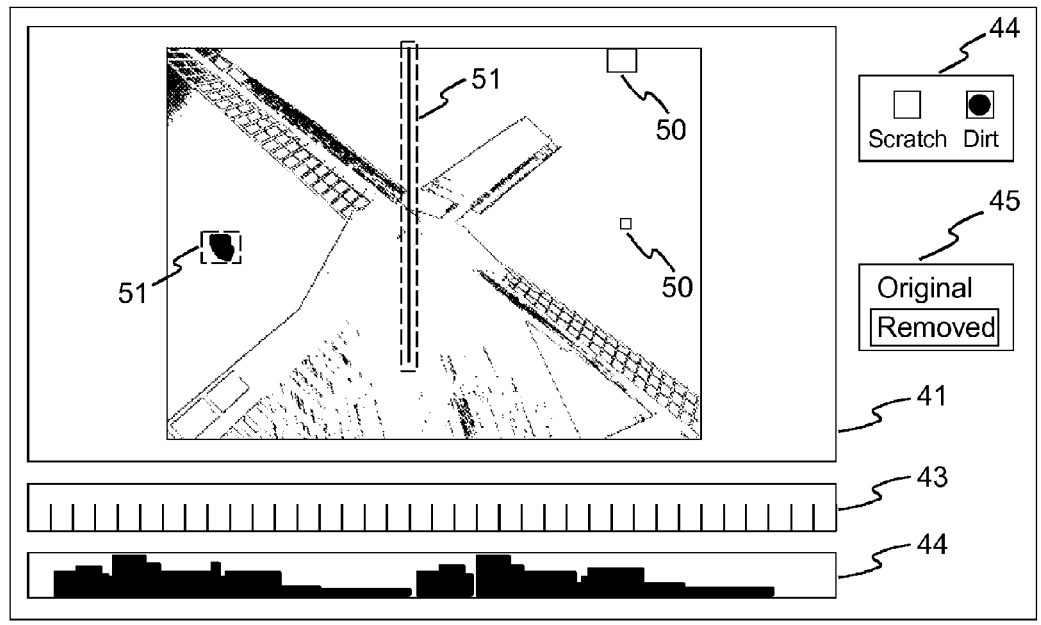

Preferably, a graphical representation of the metadata database 15 within a software application with graphical user interface is used. An exemplary graphical representation is shown in FIGS. 14 and 15. Advantageously, the graphical user interface provides aggregated metadata visualization. Outliers indicating false detections can easily be discovered in this way. The corresponding frames, which are usually few in number, require further inspection. For this purpose scratch and dirt objects 50, 51 that have been detected within a frame are annotated using the bounding box coordinates property. Depending on the removal flag property, different styles are preferably used for the bounding box. Falsely detected objects can be quickly gathered in this way.

Improving the quality of the metadata is necessary if false detections, as described above, have been identified. The corresponding metadata is either modified or extended. Falsely positive detected scratch and dirt objects are either removed from the metadata database 15 or deselected for removal by setting the toggle flag property. Scratch and dirt objects that have not or not completely been detected (false negative) can be marked by hand and added to the metadata database 15.

Referring now in more detail to the graphical user interface shown in FIGS. 14 and 15, in a first panel 41 each object 50, 51 is annotated by drawing a rectangular box, according to the size and coordinates stored in metaX(t,n).box, on top of the content of the current frame t. Objects 50 that are going to be removed, i.e. objects for which metaX(t,n).remove=true, are advantageously discriminated from objects 51 that are not going to be removed, i.e. objects for which meta(t,n).remove=false, by using different colors and/or dashing for the lines of the boxes.

In a second panel 42 the vectors metaX(t).areaDetected and/or metaX(t).areaRemoved are visualized for all frames. Since the number of frames I is usually much greater than the horizontal resolution of the display a data reduction is performed to fit the whole data into the second panel 42. As element metaX.areaDetected(t) is always equal to or greater than metaX.areaRemoved(t) the two bar plots are shown within the same panel 42 with metaX.areaRemoved in front of metaX.areaDetected.

An additional two bar plot with metaX(t).areaRemoved in front of metaX(t).areaDetected is plotted in a third panel 43. In contrast to the second panel 42 each element of metaX(t).areaRemoved in front of metaX(t).areaDetected is represented by a separate bar having a width greater than one pixel. Since the number of frames I is usually much greater than the horizontal resolution of the display only a section of the plot is visible. This section is chosen in a way that the bar corresponding to the current frame t is always in the center of the plot.

In order to prevent falsely detected objects from being removed the corresponding box is clicked or touched in order to toggle the object state of metaX(t,n).removed and the color and/or dashing of the annotation box accordingly. Favorably, when toggling the state of metaX(t,n).removed, the accumulated area in metaX(t).areaRemoved is updated instantly, as well as the plots shown in the second panel 42 and the third panel 43.

Preferably, whenever a clicking or touching of a certain position of the plots in the second panel 42 and the third panel 43 is performed, the graphical user interface switches to the corresponding frame. The content and annotations shown in the first panel 41 as well as the metadata bar plot interval in the third panel 43 are updated instantly.

A fourth panel 44 allows to select whether only scratches, only dirt, or both shall be displayed in the first panel 41. In addition, a fifth panel 45 allows to preview the output resulting from the removal process 21 instead of the original content in the first panel 41. For this purpose the removal process 21 is applied to the current frame t whenever either the checkboxes for scratch and/or dirt in the fourth panel are active and the view is changed to removed (filtered) by clicking the corresponding selection in the fifth panel 45 or pushing a shortcut key. Alternatively or in addition, the removal process 21 is applied to the current frame t when a dedicated remove/apply button is pressed (not shown).

The graphical user interface further allows to add further objects metaX(t,n+1), with index
    metaX(t,n).index=n+1,
and type
    metaX(t,n+1).type={'scratch'|'dirt'|'static dirt'| . . . }.
    These objects are flagged as
    metaX(t,n+1).remove=true
by marking, using a mouse freehand tool or the like, a region at position [xPos yPos] and having a width [xWidth yWidth] in the first panel 41:
    metaX(t,n+1).box=[xPos yPos xWidth yWidth],
    Thereby a maskX(:,:,n+1) is defined, for setting metaX(t,n+1).pixel as already described above in d). Also set are the entries
    metaX(t,n+1).indexForward={1, . . . , $N_{forward}$|0}
    metaX (t,n+1).indexBackward={1, . . . , $N_{backward}$|0}
according to f),
    metaX(t).areaDetected=metaX(t).areaDetected+sum (maskX(:,:,n+1))
according to g),
    metaX(t).areaRemoved=metaX(t).areaRemoved+sum (maskX(:,:,n+1))
according to h), and
    metaX(t,n).replacement
according to i).

Finally, scratch and dirt object removal 21 is carried out automatically using the metadata database 15 to generate the restored output 8. Therefore, results are completely predictable and the original file 7 is only modified at locations where objects have been detected and metadata has been approved for removal. More particularly, film restoration is performed by applying metadata metaX(n) to each frame t. Pixels of object n defined by metaX(t,n).pixel are modified if metaX(t,n).remove=true. Any other pixels within the frame t are left untouched.

The following procedure is performed for each object. The variables marked with "'" can also be handled "in place", i.e. without allocating additional memory, and have been introduced for illustration:
    a. For frame t set the restored output matrix y'(t) to input matrix y(t):
        y' (t)=y(t)
    b. With metaX(t,n).box find the bounding box matrix b(t,n) as described in c).
    c. Set the restored bounding box matrix b'(t,n) to b(t,n):
        b'(t,n)=b(t,n).
    d. Depending on metaX(t,n).type chose a method for modifying pixels given by metaX(t,n).pixel in b'(t,n):
        i. b'(t,n,metaX(t,n).pixel)=metaX(t,n).replacement
        ii. b'(t,n,metaX(t,n).pixel)=b'(t,n,metaX(t,n).pixel)+ metaX(t,n).replacement
        iii. Set temporary bounding box matrix b" to
            b"=y (yPos (n)+yOff (n):yPos (n)+yOff (n)+yWidth (n)−1,
            xPos (n)+xOff (n):xPos (n)+xOff (n)+xWidth (n)−1,
            i+tOff (n))
            by extracting yOff(n), xOff(n), and tOff(n) from metaX(t,n).replacement. Set
            b'(t,n,metaX(t,n).pixel)=b"(metaX(t,n).pixel).
    e) Override object i in y(n)' with restored
        y' (yPos (n):yPos (n)+yWidth (n)−1, xPos (n):xPos (n)+ xWidth(n)−1,i)=b'(t,n).

Figure 16:
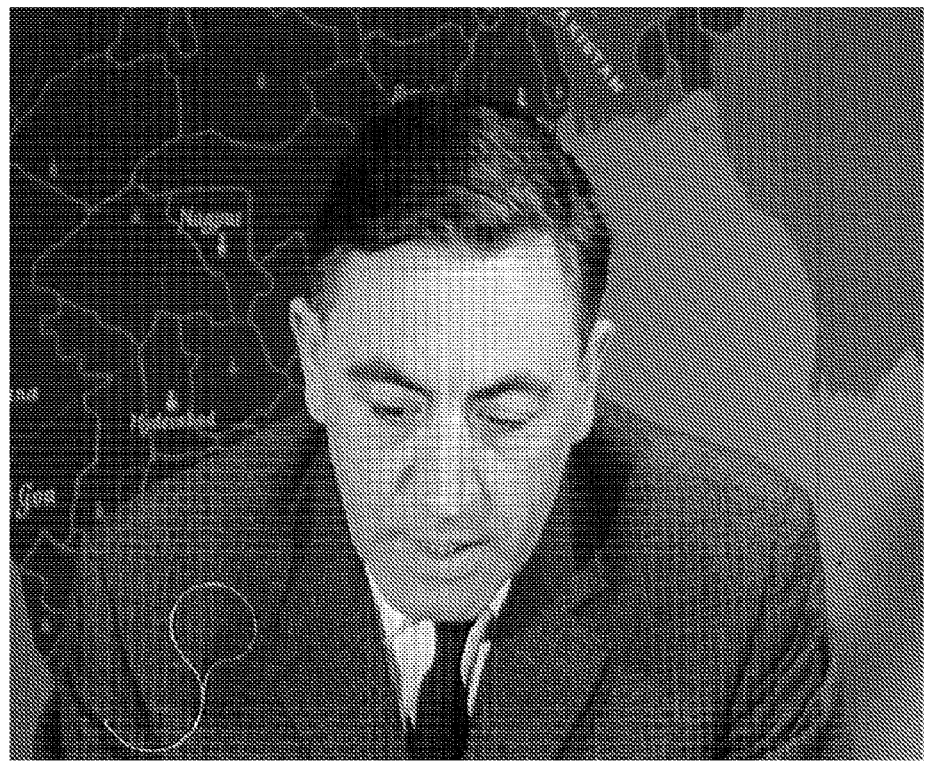
FIG. 16 depicts an original image without any restoration.
Figure 17:
FIG. 17 shows the image of FIG. 16 with metadata annotation subsequent to a detection process.
Figure 18:
FIG. 18 depicts an output image after application of a removal process.

FIGS. 16 to 18 show an exemplary result of a restoration workflow. In FIG. 16 the original image without any restoration is shown. FIG. 17 depicts the same image with metadata annotation, i.e. after a detection process 20 has been performed. FIG. 18 shows the output image after application of the removal process 21.

The invention claimed is:
1. A method for restoring an image or a sequence of images, the method comprising:

detecting artifact objects in the image or the sequence of images by clustering spurious pixels into potential artifact objects and identifying artifact objects among the potential artifact objects;

storing metadata information about the detected artifact objects in a metadata database;

performing a quality control process on the metadata information about the detected artifact objects stored in the metadata database; and removing one or more of the detected artifact objects from the image or the sequence of images based on the metadata information about the detected artifact objects stored in the metadata database;

wherein the quality control process comprises adding metadata information about artifact objects to or removing metadata information about artifact objects from the metadata database; and wherein an artifact object is removed from the metadata database by deleting the metadata information about the artifact object in the metadata database or deselecting the artifact object for removal by setting the value of the removal toggle flag.

2. The method according to claim 1, wherein the artifact objects are at least one of scratch and dirt objects.

3. The method according to claim 1, wherein the metadata information about a detected artifact object comprises one or more of an index of the artifact object, a type of the artifact object, coordinates of a rectangular bounding box of the artifact object, a frame index of the appearance of the artifact object, a binary pixel mask of bounding box size of the artifact object, a number of pixels affected by the artifact object, a detection weight, a removal flag, a removal toggle flag, and removal information.

4. The method according to claim 1, wherein the metadata information about an artifact object further comprises at least one of an index of the same artifact object in a previous image and an index of the same artifact object in a subsequent image.

5. The method according to claim 1, further comprising determining at least one of a total number of pixels covered by the detected artifact objects within an image and a total number of pixels covered by the artifact objects set for removal within the image.

6. The method according to claim 1, further comprising generating a quality report based on the metadata information stored in the metadata database.

7. An apparatus for restoring an image or a sequence of images, the apparatus comprising:

a first image processor configured to detect artifact objects in the image or the sequence of images by clustering spurious pixels into potential artifact objects and identifying artifact objects among the potential artifact objects;

a metadata database configured to store metadata information about the detected artifact objects;

a user interface configured to perform a quality control process on the metadata information about the detected artifact objects stored in the metadata database; and a second image processor configured to remove one or more of the detected artifact objects from the image or the sequence of images based on the metadata information about the detected artifact objects stored in the metadata database;

wherein the user interface is configured to enable adding metadata information about artifact objects to or removing metadata information about artifact objects from the metadata database within the quality control process; and wherein the user interface is configured to remove an artifact object from the metadata database by deleting the metadata information about the artifact object in the metadata database or by deselecting the artifact object for removal by setting a value of a removal toggle flag.

8. The apparatus according to claim 7, wherein the artifact objects are at least one of scratch and dirt objects.

9. The apparatus according to claim 7, wherein the metadata information about a detected artifact object comprises one or more of an index of the artifact object, a type of the artifact object, coordinates of a rectangular bounding box of the artifact object, a frame index of the appearance of the artifact object, a binary pixel mask of bounding box size of the artifact object, a number of pixels affected by the artifact object, a detection weight, a removal flag, a removal toggle flag, and removal information.

10. The apparatus according to claim 7, wherein the metadata information about an artifact object further comprises at least one of an index of the same artifact object in a previous image and an index of the same artifact object in subsequent image.

11. The apparatus according to claim 7, wherein the first image processor is configured to determine at least one of a total number of pixels covered by the detected artifact objects within an image and a total number of pixels covered by artifact objects set for removal within the image.

12. The apparatus according to claim 7, wherein the apparatus is configured to generate a quality report based on the metadata information stored in the metadata database.

* * * * *